(12) United States Patent
Yoshikawa

(10) Patent No.: US 11,816,990 B2
(45) Date of Patent: Nov. 14, 2023

(54) MOVING-OBJECT DETECTION APPARATUS FOR VEHICLE

(71) Applicant: SUBARU CORPORATION, Tokyo (JP)

(72) Inventor: Hikaru Yoshikawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 235 days.

(21) Appl. No.: 17/484,666

(22) Filed: Sep. 24, 2021

(65) Prior Publication Data

US 2022/0101731 A1   Mar. 31, 2022

(30) Foreign Application Priority Data

Sep. 30, 2020   (JP) ................................. 2020-165533

(51) Int. Cl.
  *G08G 1/0968* (2006.01)
  *B60Q 9/00* (2006.01)
(52) U.S. Cl.
  CPC ......... *G08G 1/096855* (2013.01); *B60Q 9/00* (2013.01)
(58) Field of Classification Search
  CPC .......................... G08G 1/096855; B60Q 9/00
  See application file for complete search history.

(56) References Cited

U.S. PATENT DOCUMENTS

2017/0371346 A1* 12/2017  Mei ...................... G05D 1/0274
2018/0113210 A1*  4/2018  Izadian .................. G01S 13/90

FOREIGN PATENT DOCUMENTS

JP        2019-066447 A     4/2019

* cited by examiner

*Primary Examiner* — James J Lee
*Assistant Examiner* — Clint Pham
(74) *Attorney, Agent, or Firm* — McDermott Will & Emery LLP

(57) ABSTRACT

A moving-object detection apparatus for a vehicle includes first and second detectors and a moving-object detector. The first and the second detectors are configured to scan rear-side and front-side regions of the vehicle to detect first and second targets as reference targets, respectively. The moving-object detector is configured to detect a movement of a moving object on the basis of the detected first and second targets. The moving object is determined with the first and the second targets. The moving-object detector includes an interpolation-region setting unit, an estimation-trajectory setting unit, and a target checking unit. The interpolation-region setting unit is configured to set a first interpolation region and set a second interpolation region. The estimation-trajectory setting unit is configured to set an estimation trajectory on a time axis. The target checking unit is configured to check a matching degree between the estimation trajectory and the second target.

11 Claims, 12 Drawing Sheets

MOVING-OBJECT DETECTION APPARATUS FOR VEHICLE

CROSS-REFERENCE TO RELATED APPLICATIONS

The present application claims priority from Japanese Patent Application No. 2020-165533 filed on Sep. 30, 2020, the entire contents of which are hereby incorporated by reference.

BACKGROUND

The technology relates to a moving-object detection apparatus for vehicle.

The following information acquiring technique is known. In this technique, respective side sensors including front-side sensors and rear-side sensors are provided at a left-front position, a right-front position, a left-rear position, and a right-rear position of an own vehicle. Each of these side sensors transmits a transmission wave having a predetermined pulse waveform to an adjacent lane, and receives a reflection wave reflected from a moving object moving on the adjacent lane. On the basis of a timing of transmitting the transmission wave and a timing of receiving the reception wave, determined are a round-trip propagation time, which is a time from the timing of transmitting the transmission wave to the timing of receiving the reception wave, and a direction from which the reflection wave is received. Further, moving-object information is acquired on the basis of the determined round-trip propagation time and the determined direction. Non-limiting examples of the moving-object information include a distance from the own vehicle to the moving object, a relative speed of the moving object with respect to the own vehicle, and a position of the moving object with respect to the own vehicle.

For example, as disclosed in Japanese Unexamined Patent Application Publication No. 2019-066447, a dead zone (a blind-spot region) is present between a scanning region of the front-side sensors and a scanning region of the rear-side sensors due to characteristics of the sensors. The dead zone refers to a section in which the moving object is undetectable from a timing when the moving object exits the scanning region of the rear-side sensors to a timing when the moving object enters the scanning region of the front-side sensors.

For example, assume a case where a moving object, which is traveling on a lane adjacent to a lane on which the own vehicle is traveling, is attempting to overtake the own vehicle from behind. The moving object may be, for example, another vehicle or a motorcycle. In such a case, the moving object first enters the scanning region of the rear-side sensors, exits the scanning region of the rear-side sensors, passes through the dead zone, and enters the scanning region of the front-side sensors. In a case where a part of the moving object closest to the own vehicle is set as a target, the target cannot be detected while the target is passing the dead zone. Therefore, it may be necessary to check whether the target detected in the scanning region of the front-side sensors is identical to the target detected in the scanning region of the rear-side sensors.

In this case, the scanning region of the front-side sensors and the scanning region of the rear-side sensors are knowable in advance, and the dead zone is also determined in advance. Therefore, calculating a movement trajectory of the target on the basis of the targets detected by the rear-side sensors at predetermined respective cycles makes it possible to estimate a time when and a position where the moving object enters the scanning region of the front-side sensors after passing through the dead zone.

Accordingly, comparing the time when and the position where the target detected by the front-side sensors enters the scanning region of the front-side sensors with the movement trajectory (the time when and the position where the target enters the scanning region of the front-side sensors) of the target calculated on the rear-side sensor side makes it possible to check whether the target detected in the scanning region of the front-side sensors and the target detected in the scanning region of the rear-side sensors are identical to each other.

SUMMARY

An aspect of the technology provides a moving-object detection apparatus for a vehicle. The moving-object detection apparatus includes a first detector, a second detector, and a moving-object detector. The first detector is configured to scan a rear-side region of the vehicle to detect a first target as a reference target. The second detector is configured to scan a front-side region of the vehicle to detect a second target as the reference target. The moving-object detector is configured to detect a movement of a moving object on the basis of the first target detected by the first detector and the second target detected by the second detector. The moving object is determined with the first target and the second target. The moving-object detector includes an interpolation-region setting unit, an estimation-trajectory setting unit, and a target checking unit. The interpolation-region setting unit is configured to set a first interpolation region on an adjacent lane in a scanning region of the first detector and set a second interpolation region on the adjacent lane in a scanning region of the second detector. The adjacent lane is a lane that is adjacent to a lane on which the vehicle is traveling. The estimation-trajectory setting unit is configured to set an estimation trajectory on a time axis on the basis of a traveling trajectory of the first target detected in the second interpolation region. The estimation trajectory is a trajectory for estimating a movement of the first target into the first interpolation region. The target checking unit is configured to check a matching degree between the estimation trajectory and the second target.

An aspect of the technology provides a moving-object detection apparatus for a vehicle that the moving-object detection apparatus includes a first detector, a second detector, and circuitry. The first detector is configured to scan a rear-side region of the vehicle to detect a first target as a reference target. The second detector is configured to scan a front-side region of the vehicle to detect a second target as the reference target. The circuitry is configured to detect a movement of a moving object on the basis of the first target detected by the first detector and the second target detected by the second detector. The moving object is determined with the first target and the second target. The circuitry is configured to set a first interpolation region on an adjacent lane in a scanning region of the first detector and set a second interpolation region on the adjacent lane in a scanning region of the second detector. The adjacent lane is a lane that is adjacent to a lane on which the vehicle is traveling. The circuitry is configured to set an estimation trajectory on a time axis on the basis of a traveling trajectory of the first target detected in the first interpolation region. The estimation trajectory is a trajectory for estimating a movement of the first target into the second interpolation region. The circuitry is configured to check a matching degree between the estimation trajectory and the second target.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Upon receiving a reflection wave from a target, a rear-side sensor may receive, in addition to the reflection wave from the target, various noise components superimposed on the reflection wave. Therefore, if a movement trajectory estimated on the basis of the target detected by the rear-side sensor and the target detected by a front-side sensor is simply compared with each other, the noise components may be falsely detected as the identical target.

It is desirable to provide a moving-object detection apparatus for vehicle that makes it possible to prevent false detection.

Figure 7:
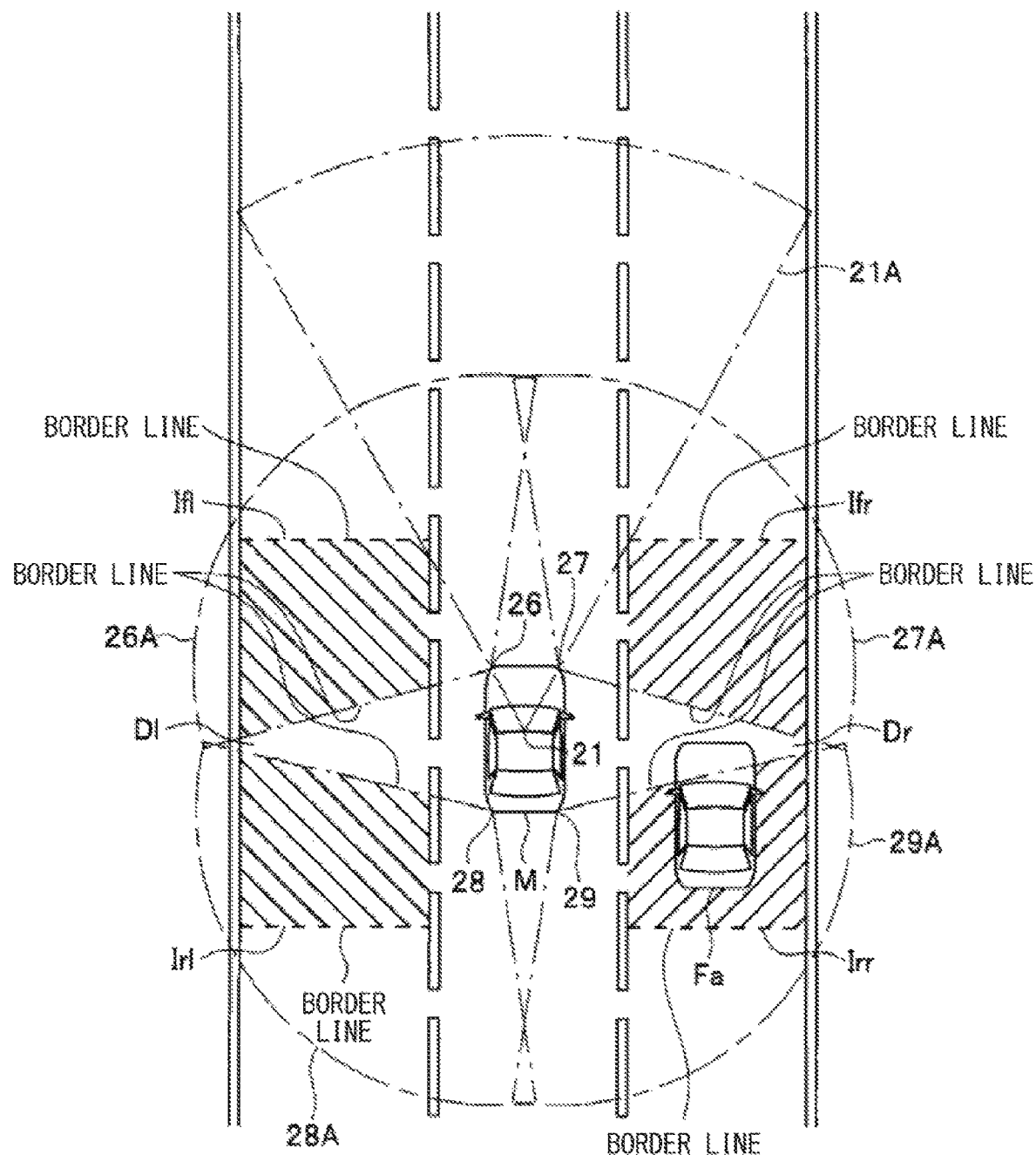
FIG. 7 is a birds-eye view of an example of a state where a vehicle enters a dead zone between a scanning region and an interpolation region set on the side of an own vehicle.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description. A reference sign M in FIG. 7 represents an own vehicle traveling on a traveling lane. As a moving object traveling on a lane (e.g., a passing lane) adjacent to the traveling lane of the own vehicle M, a vehicle Fa illustrated in FIG. 7 or a motorcycle Fb illustrated in FIG. 8 may be present. The lane adjacent to the traveling lane of the own vehicle M is hereinafter also simply referred to as an "adjacent lane". The vehicle Fa illustrated in FIG. 7 is hereinafter referred to as a "following vehicle" Fa. The example embodiment is described below assuming a left-hand traffic road. Therefore, "left" and "right" in the following description shall be the opposite for a case of a right-hand traffic road.

Figure 1:
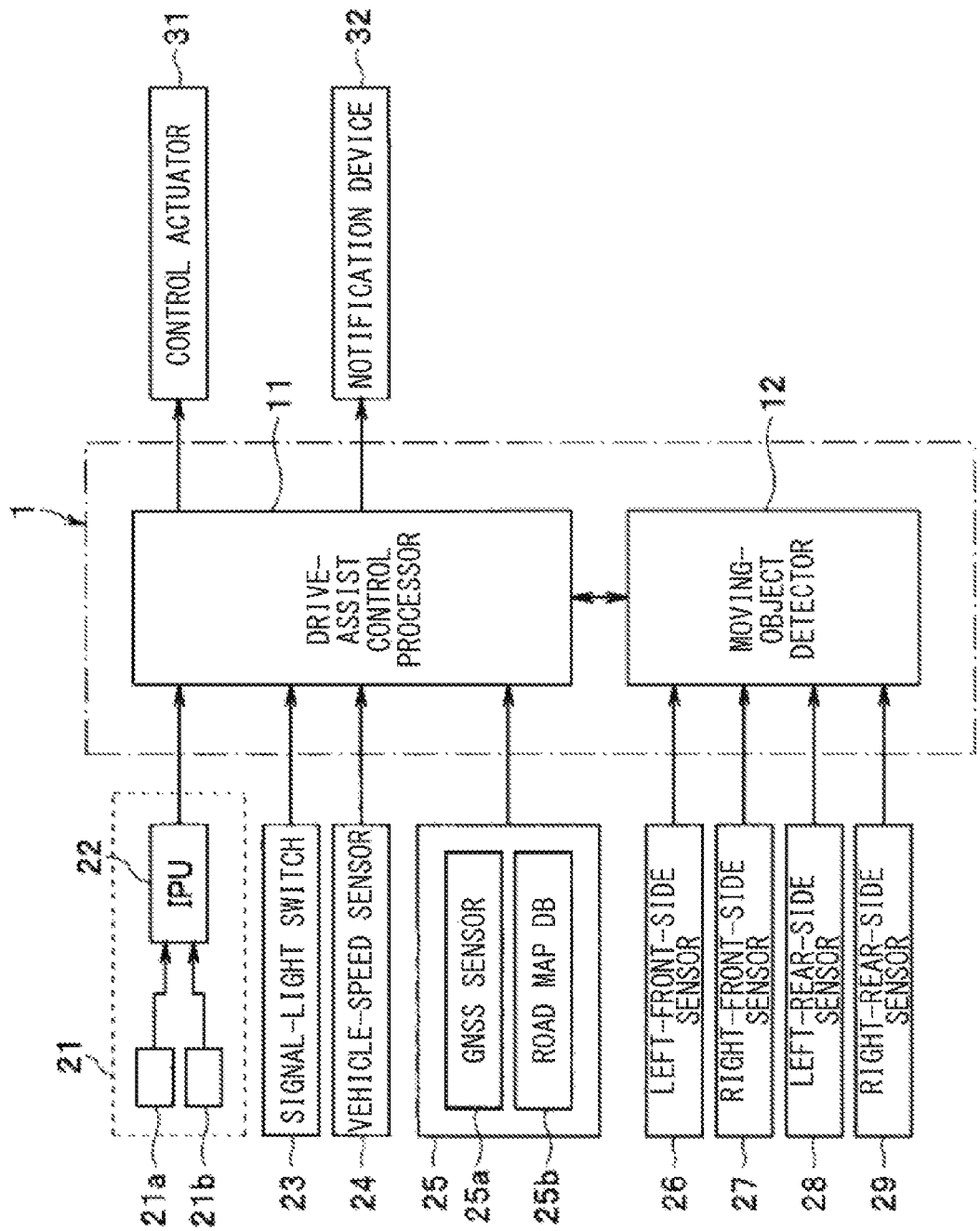
FIG. 1 is a schematic diagram illustrating an example of a configuration of a drive-assist apparatus.

Mounted on the own vehicle M may be a drive-assist apparatus 1 illustrated in FIG. 1. The drive-assist apparatus 1 may include units including, without limitation, a drive-assist control processor 11 and a moving-object detector 12. The drive-assist control processor 11 and the moving-object detector 12 may be coupled to each other via an in-vehicle communication line which allows the drive-assist control processor 11 and the moving-object detector 12 to freely perform bidirectional communication. Non-limiting examples of the in-vehicle communication line may include a controller area network (CAN). The drive-assist control processor 11 and the moving-object detector 12 may each include: a microcomputer including, without limitation, a central processing unit (CPU), a read-only memory (ROM), and a random-access memory (RAM); and a peripheral device thereof. The ROM may store, for example but not limited to: a control program that allows for operation set for each system; and fixed data.

Coupled to an input side of the drive-assist control processor 11 may be, for example but not limited to, an on-vehicle camera unit 21, a signal-light switch 23, a vehicle-speed sensor 24, and a map locator unit 25. The signal-light switch 23 may include a left-turn switch that is turned on upon turning left and a right-turn switch that is turned on upon turning right. The vehicle-speed sensor 24 may detect a vehicle speed (a vehicle speed of the own vehicle M). The on-vehicle camera unit 21 may include a stereo camera and an image processing unit (IPU) 22. The stereo camera may include a main camera 21a and a subsidiary camera 21b. The main camera 21a and the subsidiary camera 21b may be disposed horizontally at respective positions that are above a room mirror in a front part inside the own vehicle M, close to a windshield, and have substantially the same distance on the right and the left from the middle in a vehicle width direction. The IPU 22 may perform a predetermined image process on traveling-environment images of a predetermined imaging region 21A (see FIGS. 7 and 8) in front of the own vehicle M that have been captured by the main camera 21a and the subsidiary camera 21b. Thereafter, the on-vehicle camera unit 21 may supply the processed traveling-environment images to the drive-assist control processor 11.

The map locator unit 25 may include a global navigation satellite system (GNSS) sensor 25a and a road map database 25b. The GNSS sensor 25a may receive positioning signals transmitted from positioning satellites to acquire position coordinates of the own vehicle M. The road map database 25b may be a large-capacity storage medium such as a hard disk drive (HDD), and store known road map information. Non-limiting examples of the stored road map information may include a type of a road (an ordinary road, an arterial road, a highway, etc.), a shape of the road, a direction of the road, the number of lanes, and a lane width. The drive-assist control processor 11 may perform map matching to relate the position coordinates (a latitude, a longitude, and an altitude) acquired by the GNSS sensor 25a to the road map information stored in the road map database 25b, thereby estimating the position (current position) of the own vehicle M on the road map, and which lane the own vehicle M is traveling on if the own vehicle M is traveling on a road having two or more lanes.

Coupled to an output side of the drive-assist control processor 11 may be a control actuator 31 and a notification device 32. The term "control actuator 31" is a generic term for power actuators, electric power steering (EPS) actuators, brake actuators, etc. that assist a traveling state of the own vehicle M. The power actuators may control output of a driving source such as an engine or an electric motor. The EPS actuator may control driving of the EPS motor. The brake actuator may adjust brake hydraulic pressure applied to a brake wheel cylinder provided on each wheel. The notification device 32 may prompt a driver to pay attention by means of, for example but not limited to, a beep, a sound, and a display on a monitor.

The drive-assist control processor 11 may cause the control actuator 31 to operate on the basis of the traveling-environment information received from the camera unit 21 to execute various drive-assist controls including, without limitation, a well-known advanced emergency braking (AEB) control, a well-known adaptive cruise control (ACC), a well-known active lane keep (ALK) control, and a well-known lane departure prevention (LDP) control.

In a case where the drive-assist control processor 11 serves to allow for automatic driving, the drive-assist control processor 11 may set a traveling route to a destination on the basis of information from the map locator unit 25, and cause the control actuator 31 to operate to achieve automatic driving in an automatic driving section set on the traveling route. The destination may be set by the driver. In a case where the driver performs operation on a steering wheel to turn on the signal-light switch 23 for making a lane change, and where the moving-object detector 12, which will be described later, detects a movement of a moving object that approaches the own vehicle M from behind or travels in parallel to the own vehicle M on an adjacent lane to which the own vehicle M is to make the lane change, the drive-assist control processor 11 may cause the notification device 32 to operate to prompt the driver to pay attention.

Figure 8:
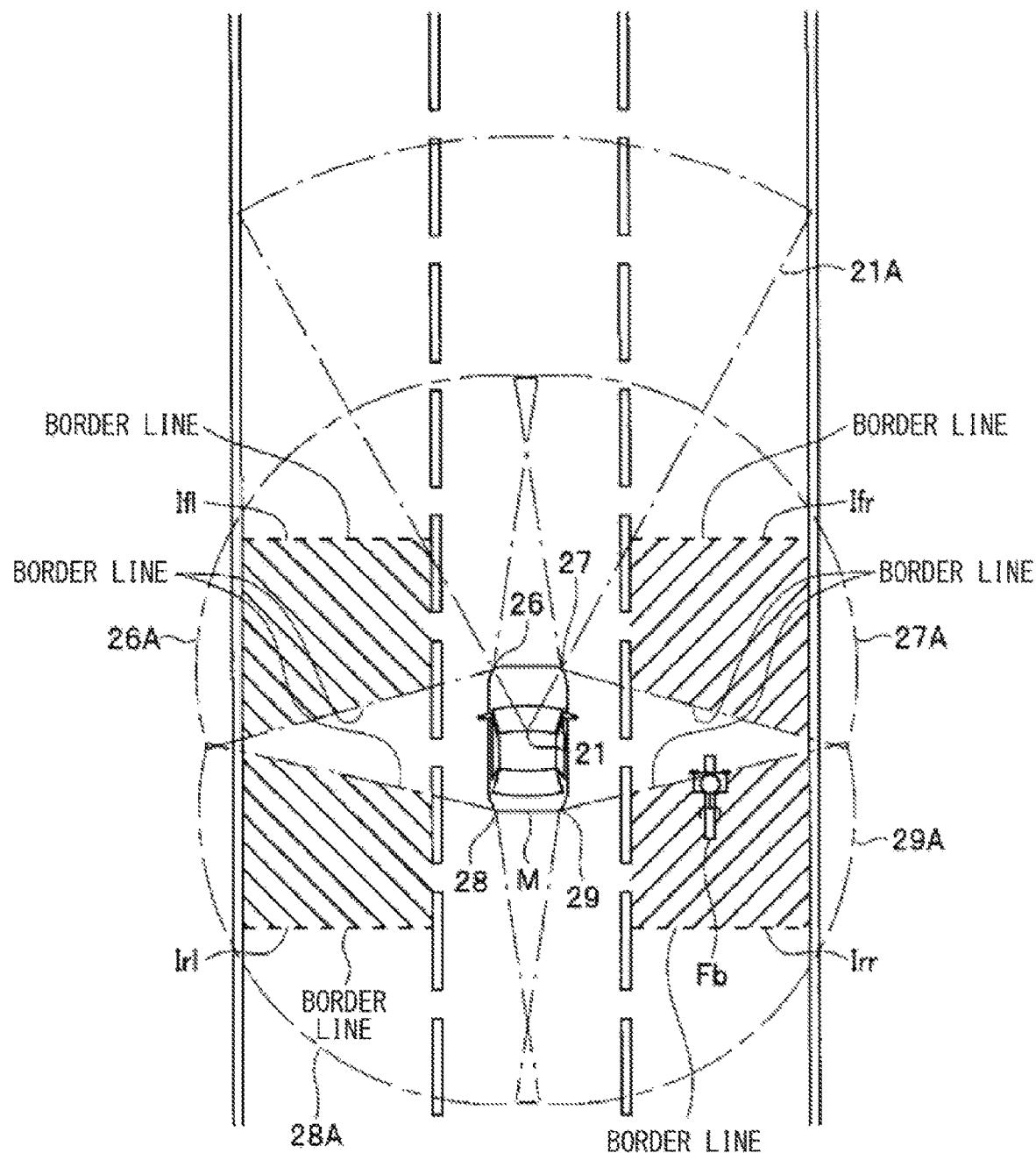
FIG. 8 is a birds-eye view of an example of a state where a motorcycle enters the dead zone between the scanning region and the interpolation region set on the side of the own vehicle.

Coupled to an input side of the moving-object detector 12 may be a left-front-side sensor 26 and a right-front-side sensor 27 as front-side detectors, and a left-rear-side sensor 28 and a right-rear-side sensor 29 as rear-side detectors. The left-front-side sensor 26, the right-front-side sensor 27, the left-rear-side sensor 28, and the right-rear-side sensor 29 may each include, for example but not limited to, a millimeter-wave radar, a microwave radar, or a light detection and ranging (LiDAR). As illustrated in FIGS. 7 and 8, the left-front-side sensor 26 and the right-front-side sensor 27 may be disposed, for example, on a left ridge and a right ridge of a front bumper, respectively. The left-rear-side sensor 28 and the right-rear-side sensor 29 may be disposed, for example, on a left ridge and a right ridge of a rear bumper, respectively. Hereinafter, the left-front-side sensor 26, the right-front-side sensor 27, the left-rear-side sensor 28, and the right-rear-side sensor 29 are each sometimes simply referred to as a "side sensor". In addition, the left-front-side sensor 26 and the right-front-side sensor 27 are sometimes collectively referred to as "front-side sensors", and the left-rear-side sensor 28 and the right-rear-side sensor 29 are sometimes collectively referred to as "rear-side sensors".

The left-front-side sensor 26 may scan a region from the left-front to the side of the own vehicle M, i.e., a scanning region 26A, in a fan-like shape. The right-front-side sensor 27 may scan a region from the right-front to the side of the own vehicle M, i.e., a scanning region 27A, in a fan-like shape. The left-rear-side sensor 28 may scan a region from the rear to the left side of the own vehicle M, i.e., a scanning region 28A, in a fan-like shape. The right-rear-side sensor 29 may scan a region from the rear to the right side of the own vehicle M, i.e., a scanning region 29A, in a fan-like shape. The scanning region 28A and the scanning region 29A may be the regions that cannot be scanned by either the left-front-side sensor 26 or the right-front-side sensor 27.

As illustrated in FIGS. 7 and 8, the scanning regions 26A and 28A respectively scanned by the left-front-side sensor 26 and the left-rear-side sensor 28 that scan the left side of the own vehicle M may not cover the entire region on the left side of the own vehicle M due to the sensor characteristics thereof. In addition, the scanning regions 27A and 29A respectively scanned by the right-front-side sensor 27 and the right-rear-side sensor 29 that scan the right side of the own vehicle M may not cover the entire region on the right side of the own vehicle M due to the sensor characteristics thereof. Therefore, as illustrated in FIGS. 7 and 8, a non-scannable dead zone (a blind-spot region) Dl may be present between the scanning regions 26A and 28A, and a non-scannable dead zone (a blind-spot region) Dr may be present between the scanning regions 27A and 29A.

The scanning regions 26A to 29A of the respective side sensors 26 to 29 may each have a fan-like shape. In addition, a border line between the scanning region 26A and the dead zone Dl and a border line between the scanning region 28A and the dead zone Dl may intersect each other at far ends of the scanning regions 26A and 28A. A border line between the scanning region 27A and the dead zone Dr and a border line between the scanning region 29A and the dead zone Dr may intersect each other at far ends of the scanning regions 27A and 29A. Therefore, the dead zones Dl and Dr according to the example embodiment may each have a triangular shape with a side surface of the own vehicle M as a base. The dead zones Dl and Dr may each be uniquely determined on the basis of the installed positions of the side sensors 26 to 29 with respect to the own vehicle M and the sensor characteristics of the side sensors 26 to 29. The side sensors 26 to 29 may each transmit a transmission wave having a predetermined pulse waveform to corresponding one of the scanning regions 26A to 29A, and receive a reflection wave.

Figure 2:
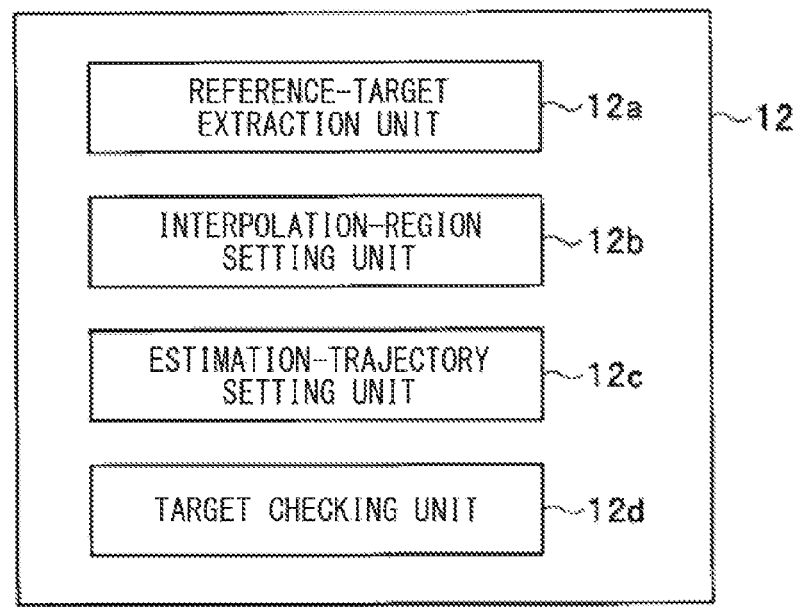
FIG. 2 is a block diagram illustrating an example of a configuration of a moving-object detector.

As illustrated in FIG. 2, the moving-object detector 12 may include a reference-target extraction unit 12a, an interpolation-region setting unit 12b, an estimation-trajectory setting unit 12c, and a target checking unit 12d.

The reference-target extraction unit 12a may perform sampling on the reflection waves received by the respective side sensors 26 to 29 for a predetermined time period. A sampling interval (t) may be set longer than a period of one frame for receiving the reflection wave. For example, in a case of sampling in which the reflection waves are measured at intervals of two seconds, the reference-target extraction unit 12a may measure eight reflection waves, i.e., perform the sampling for 14 seconds. Further, the reference-target extraction unit 12a may average the measured eight reflection waves, and set the averaged waveform as an average reflection wave. Accordingly, upon setting the next average reflection wave, the reference-target extraction unit 12a may clear the oldest one of the eight reflection waves and add a newly measured reflection wave for calculation. The reference-target extraction unit 12a may thus set the average reflection waves at intervals of two seconds.

Figure 9:
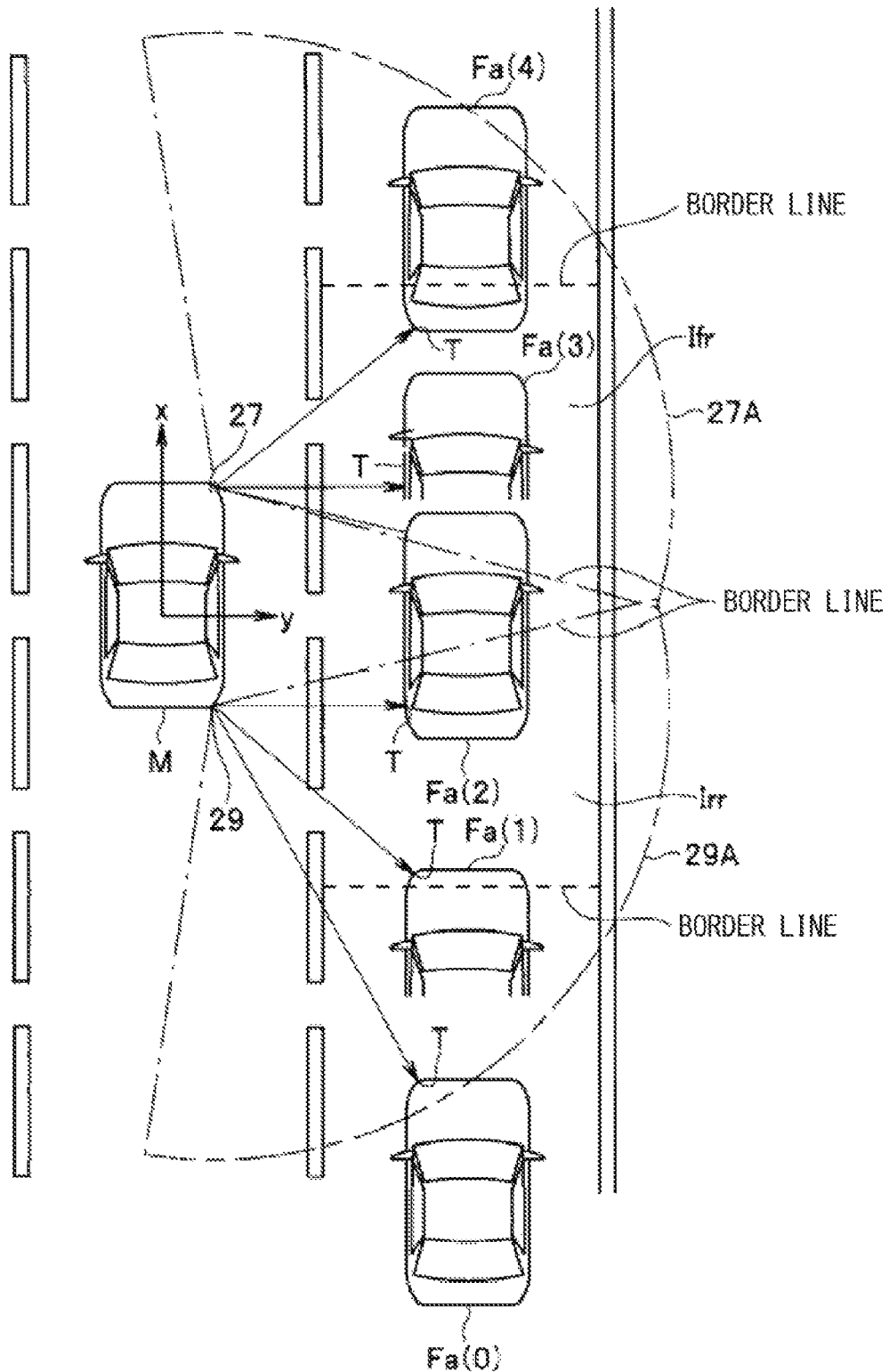
FIG. 9 is a birds-eye view of an example of extracting a reference target from among targets acquired from a following vehicle.

Further, as illustrated in FIG. 9, the reference-target extraction unit 12a may extract, from among the set average reflection waves, a target having the shortest distance from the side sensor that has received the reflection waves, as a reference target T. The reference-target extraction unit 12a may acquire target information on the basis of the round-trip propagation time of the extracted reference target T and a direction from which the reflection wave from the reference target T has been received. Non-limiting examples of the target information may include a distance from the own vehicle M to the reference target T, a relative vehicle speed of the reference target T with respect to the own vehicle M, and position coordinates on the road map of the reference target T with respect to the own vehicle M. A process to be performed by the reference-target extraction unit 12a may be a known technique, and is therefore not described further in detail here.

The interpolation-region setting unit 12b may set front-side interpolation regions Ifl and Ifr and rear-side interpolation regions Irl and Irr on lanes adjacent to the traveling lane of the own vehicle M, i.e., the adjacent lanes. Hereinafter, the front-side interpolation regions Ifl and Ifr and the rear-side interpolation regions Irl and Irr are each sometimes simply referred to as a "side interpolation region". The side interpolation regions Ifl, Ifr, Irl, and Irr may be used to check whether the reference target T as a first target extracted from the scanning region 28A of the left-rear-side sensor 28 and the scanning region 29A of the right-rear-side sensor 29 and the reference target T as a second target extracted from the scanning region 26A of the left-front-side sensor 26 and the scanning region 27A of the right-front-side sensor 27 match each other.

The estimation-trajectory setting unit 12c may set an estimation trajectory Qd and an estimation trajectory Q on a time axis on the basis of a traveling trajectory in a case where the reference target T passes the rear-side interpolation regions Irl and Irr. The estimation trajectory Qd may be used to estimate a movement of the reference target T that passes through the dead zones Dl and Dr. The estimation trajectory Q may be used to estimate a movement of the reference target T that passes through the front-side interpolation regions Ifl and Ifr.

The target checking unit 12d may compare the reference target T detected in the front-side interpolation regions Ifl and Ifr and the estimation trajectory Q with each other to thereby check whether such a reference target T and the estimation trajectory Q match each other.

Figure 3:
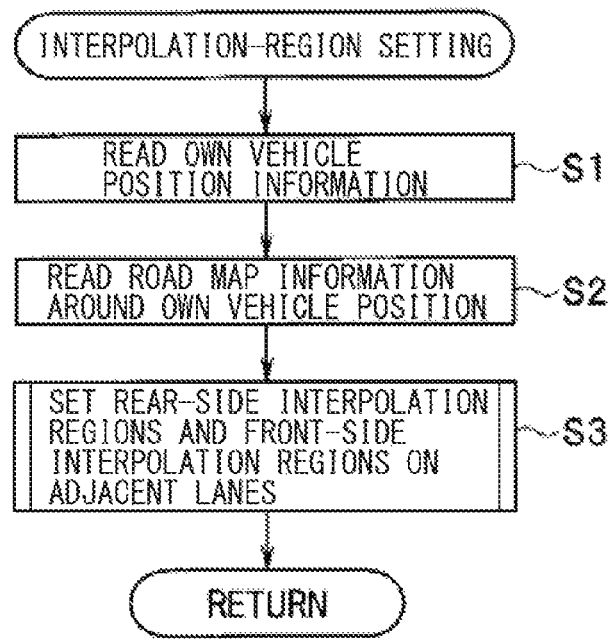
FIG. 3 is a flowchart illustrating an example of an interpolation-region setting routine.

The interpolation-region setting unit 12b of the moving-object detector 12 may set the interpolation regions, for example, in accordance with an interpolation-region setting routine illustrated in FIG. 3. In the interpolation-region setting routine, first, in step S1, the interpolation-region setting unit 12b may read the own vehicle position information estimated by the map locator unit 25 or estimated on the basis of the traveling-environment information from the camera unit 21. Thereafter, the process may be caused to proceed to step S2. In step S2, the interpolation-region setting unit 12b may read road map information around the own vehicle position from the road map database 25b on the basis of the estimated own vehicle position.

Thereafter, the process may be caused to proceed to step S3. In step S3, the interpolation-region setting unit 12b may acquire information of lanes adjacent to the traveling lane on which the own vehicle M is currently traveling, i.e., an adjacent lane, from the road map database 25b or the traveling-environment information from the camera unit 21. Further, the interpolation-region setting unit 12b may set the rear-side interpolation regions Irl and Irr and the front-side interpolation regions Ifl and Ifr on the adjacent lanes. As illustrated in FIGS. 7 and 8, the scanning regions 26A to 29A of the respective side sensors 26 to 29 set around the own vehicle M may be calculated on the basis of the characteristics of the respective side sensors 26 to 29. The dead zones Dl and Dr can be also calculated on the basis of the installed positions of the respective side sensors 26 to 29 with respect to the own vehicle M.

Front-rear directions of the front-side interpolation regions Ifl and Ifr may be set in directions from the border lines of the dead zones Dl and Dr toward inside of the scanning regions 26A and 27A, respectively. Front-rear directions of the rear-side interpolation regions Irl and Irr may be set in directions from the border lines of the dead zones Dl and Dr toward inside of the scanning regions 28A and 29A, respectively.

Therefore, the border lines of the dead zones Dl and Dr, the border lines of the rear-side interpolation regions Irl and Irr, and the border lines of the front-side interpolation regions Ifl and Ifr may be stored in advance as position coordinates using the own vehicle M as a reference. For example, as illustrated in FIG. 9, the center of the own vehicle M may be set as the origin, a front-rear direction may be set as an x-axis, and the vehicle width direction may be set as a y-axis to set position coordinates. Front border lines of the front-side interpolation regions Ifl and Ifr may be set at respective positions that are away from the own vehicle M by several meters in the front direction. Rear border lines of the rear-side interpolation regions Irl and Irr may be set at respective positions that are away from the own vehicle M by several meters in the rear direction.

The interpolation-region setting unit 12b may set a vehicle width direction of each of the adjacent lanes by acquiring it from the road map information. In this case, the interpolation-region setting unit 12b may read the traveling-environment information from the camera unit 21 in step S2, and calculate a lane width of each of the adjacent lanes on the basis of the read traveling-environment information.

Accordingly, in step S3, the interpolation-region setting unit 12b may set the side interpolation regions Ifl, Ifr, Irl, and Irr as hatched in FIGS. 7 and 8 in regions surrounded by the border lines in the front-rear direction of the side interpolation regions Ifl, Ifr, Irl, and Irr and border lines in a left-right direction set on the basis of lane-line information of the adjacent lanes. Thereafter, the process may be caused to exit the interpolation-region setting routine.

Figure 4:
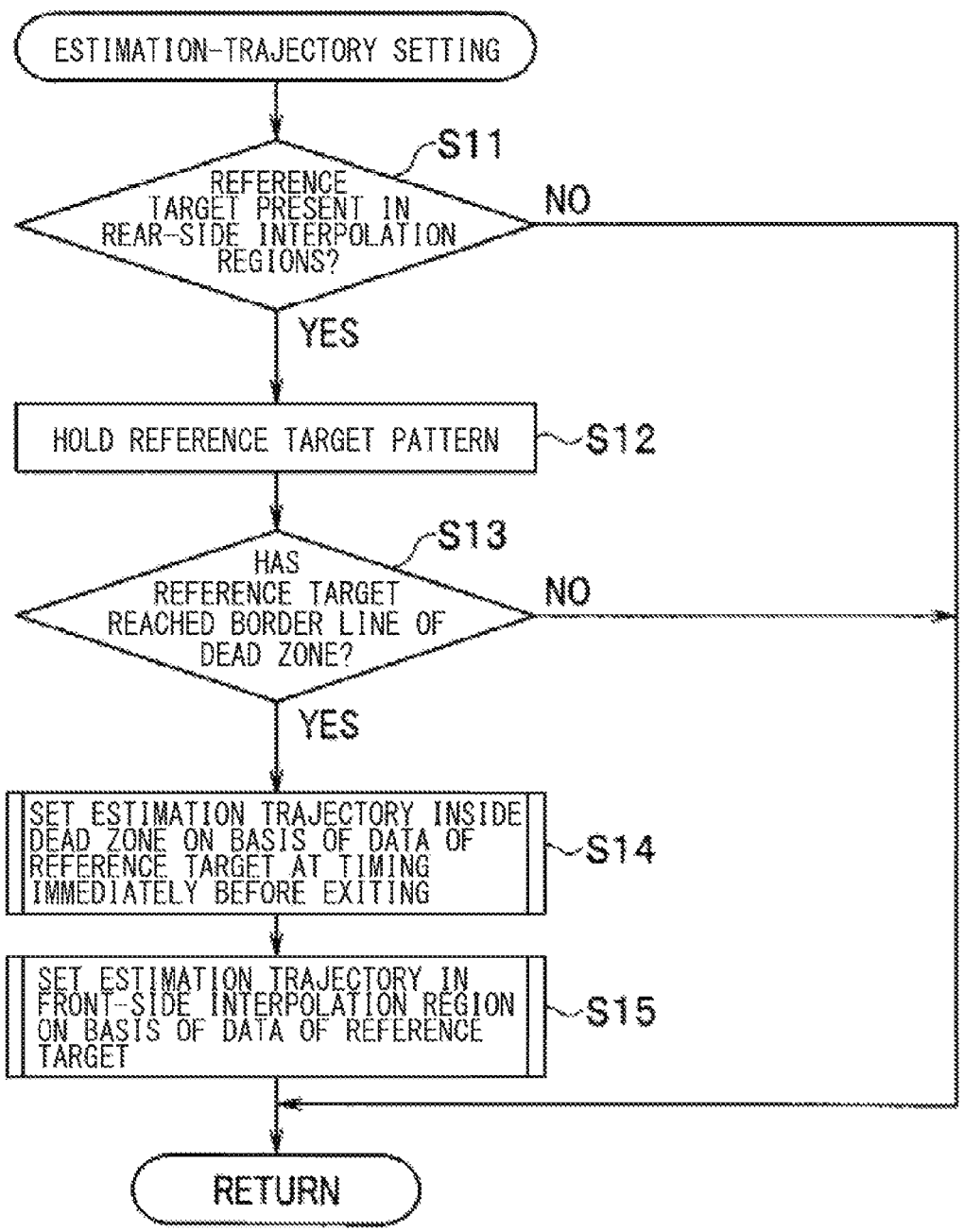
FIG. 4 is a flowchart illustrating an example of an estimation-trajectory setting routine.

The estimation-trajectory setting unit 12c may set an estimation trajectory, for example, in accordance with an estimation-trajectory setting routine illustrated in FIG. 4. The estimation-trajectory setting unit 12c may execute the estimation-trajectory setting routine in synchronization with the sampling interval (t) of the sampling performed by the reference-target extraction unit 12a. First, in step S11, the estimation-trajectory setting unit 12c may check whether the reference target T is present in one or both of the left-rear-side interpolation region Irl and the right-rear-side interpolation region Irr on the basis of the reference target T held in the reference-target extraction unit 12a. In a case where the reference target T is present in one or both of the left-rear-side interpolation region Irl and the right-rear-side interpolation region Irr (YES in step S11), the process may be caused to proceed to step S12. In a case where the reference target T is not present in either of the left-rear-side interpolation region Irl and the right-rear-side interpolation region Irr (NO in step S11), the process may be caused to exit the estimation-trajectory setting routine.

Note that a determination as to whether the reference target T extracted from the targets detected by the left-front-side sensor 26 and the estimation trajectory Q match each other and a determination as to whether the reference target T extracted from the targets detected by the right-front-side sensor 27 and the estimation trajectory Q match each other may be performed by similar processes. Therefore, the processes for the above-described two determinations are described together below with use of expressions "front-side sensor (26, 27)", "front-side interpolation (Ifl, Ifr)", "dead zone (Dl, Dr)", and so on.

In step S12, the estimation-trajectory setting unit 12c may plot the reference target T on the coordinates on the road map, and hold a time-series reference target pattern. Thereafter, the process may be caused to proceed to step S13. The reference target T may be set on the basis of the target having the shortest distance from the rear-side sensor (28, 29) receiving the reflection wave. For example, as illustrated in FIG. 9, assume a situation where a following vehicle Fa approaches the own vehicle M from behind to overtake the own vehicle M. In this situation, the following vehicle Fa may be a moving object that is traveling on an adjacent lane on the right of the traveling lane of the own vehicle M.

In this case, the following vehicle Fa may first enter the scanning region 29A of the right-rear-side sensor 29 (Fa(0)), and thereafter enter the rear-side interpolation region Irr (Fa(1)). Thereafter, the following vehicle Fa may pass through the dead zone Dr (Fa(2)), and enter the front-side interpolation region Ifr and the scanning region 27A of the right-front-side sensor 27 (Fa(3)). Thereafter, the following vehicle Fa may exit the front-side interpolation region Ifr, and also exit the scanning region 27A of the right-front-side sensor 27 (Fa (4)).

Until the following vehicle Fa enters the scanning region 29A and reaches the vicinity of the side of the right-rear-side sensor 29, the target near a left ridge of a front part of the following vehicle Fa may be extracted as the reference target T. In a period after a timing when the front part of the following vehicle Fa reaches the side of the right-rear-side sensor 29 and while the front part of the following vehicle Fa is passing the side of the right-rear-side sensor 29, a side surface of the right-rear-side sensor 29 may be the part closest to the right-rear-side sensor 29.

Therefore, the reference-target extraction unit 12a may extract, from among the targets detected by the right-rear-side sensor 29, the target whose side surface is detected, as the reference target T. After a rear part of the following vehicle Fa passes through the side of the right-rear-side sensor 29, the reference-target extraction unit 12a may extract, from among the targets detected by the right-rear-side sensor 29, the target whose portion in the vicinity of a left ridge of the rear part of the following vehicle Fa is detected, as the reference target T.

Figure 10A:
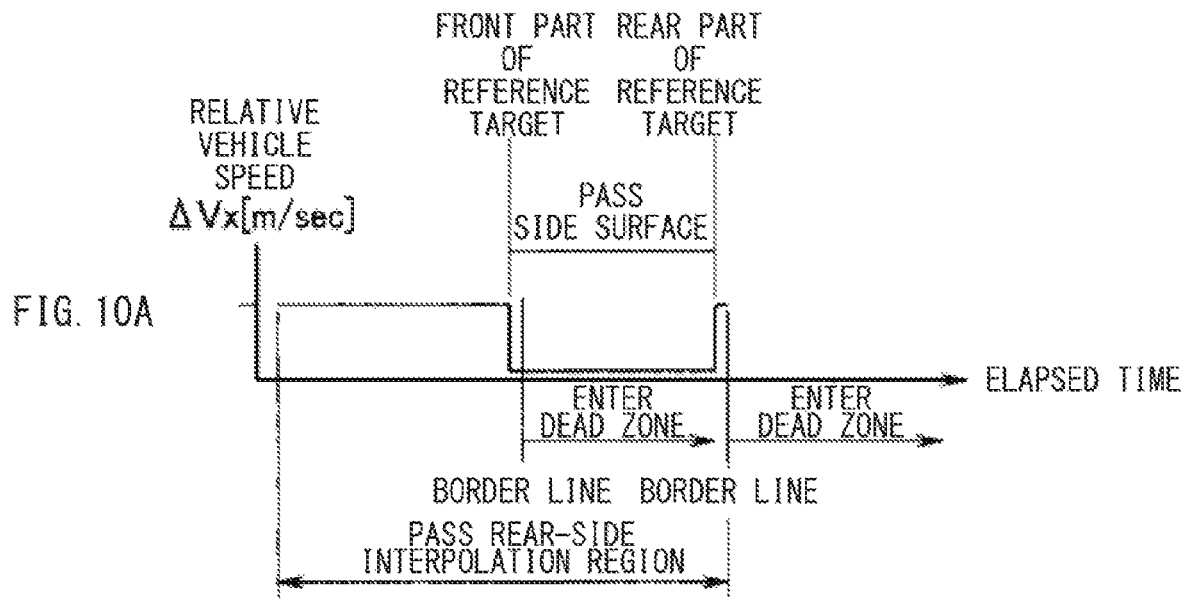
FIG. 10A is a time chart illustrating an example of a reference target pattern focusing on variation in relative vehicle speed in a case where the following vehicle passes a rear-side interpolation region.

For example, FIG. 10A schematically illustrates a reference target pattern representing variation in relative vehicle speed ΔVx (m/sec) in the front-rear direction obtained from the reference target T in a period in which the following vehicle Fa is to overtake the own vehicle M, enters the rear-side interpolation region Irr, and exits the rear-side interpolation region Irr to enter the dead zone Dr. For simple description, assume that the following vehicle Fa has a constant distance in a lateral direction, i.e., a constant lateral position, from the own vehicle M, and keeps a constant relative vehicle speed. Accordingly, the description is given below assuming that the relative vehicle speed ΔVy in the lateral direction is 0 (m/sec).

As illustrated in FIG. 10A, the reference-target extraction unit 12a may extract the front part of the following vehicle Fa as the reference target T in a period from a timing when the following vehicle Fa enters the rear-side interpolation region Irr to approach the right-rear-side sensor 29 from behind to a timing when the front part of the following vehicle Fa reaches the side of the right-rear-side sensor 29. Therefore, the relative vehicle speed ΔVx in the front-rear direction may be detectable from the reference target T.

While the side surface of the following vehicle Fa is passing the side of the right-rear-side sensor 29, the relative vehicle speed ΔVx may be substantially 0 (m/sec). Therefore, a correct relative vehicle speed ΔVx may not be detectable from the reference target T. It goes without saying that, in this case, the position coordinates of the following vehicle Fa may be fixed at substantially the same position.

Thereafter, the rear part of the following vehicle Fa may reach the position of the right-rear-side sensor 29 in the lateral direction and then move away from the lateral direction of the right-rear-side sensor 29. This may cause the reference-target extraction unit 12a to extract the rear part of the following vehicle Fa as the reference target T. Therefore, the relative vehicle speed ΔVx in the front-rear direction may be detected again.

Thereafter, the process may be caused to proceed to step S13. In step S13, the estimation-trajectory setting unit 12c may check whether the reference target T extracted by the reference-target extraction unit 12a from among the targets detected by the rear-side sensor (28, 29) has reached the border line of the dead zone (Dl, Dr). In a case where the reference target T has not reached the border line of the dead zone (Dl, Dr) (NO in step S13), the process may be caused to exit the estimation-trajectory setting routine. In a case where the reference target T has reached the border line of the dead zone (Dl, Dr) (YES in step S13), the process may be caused to proceed to step S14. The estimation-trajectory setting unit 12c may check whether the reference target T has reached the border line of the dead zone (Dl, Dr), for example, by comparing the position coordinates of the reference target T with respect to the own vehicle M and the pre-set position coordinates of the border line of the dead zone (Dl, Dr) with each other.

In step S14, the estimation-trajectory setting unit 12c may set the estimation trajectory Qd passing inside the dead zone (Dl, Dr) on the basis of the reference target T at a timing immediately before the following vehicle Fa exits the rear-side interpolation region (Irl, Irr), i.e., on the basis of the reference target T extracting the rear part of the following vehicle Fa described above with reference to FIG. 10A. Thereafter, the process may be caused to proceed to step S15. Note that the set estimation trajectory Qd may include the position coordinates (x1, y1) for estimating the movement of the estimation reference target and a vehicle speed (Vx1, Vy1) of the same timing held in synchronization with the sampling interval (t) of the sampling performed by the reference-target extraction unit 12a.

Accordingly, the position coordinates and the relative vehicle speed of the target moving inside the dead zone (Dl, Dr) may be estimated on the basis of the estimation trajectory Qd. Therefore, for example, in a case of a moving object such as the motorcycle Fb having a short length in the front-rear direction illustrated in FIG. 8, even if the entire motorcycle Fb is present in the dead zone (Dl, Dr) in a process of overtaking the own vehicle M and the motorcycle Fb becomes undetectable by any of the two side sensors (26, 27) and (28, 29), the movement of the moving object (the motorcycle Fb) moving in the dead zone (Dl, Dr) is allowed to be estimated on the basis of the estimation trajectory Qd.

In step S15, the estimation-trajectory setting unit 12c may set an estimation trajectory Qn of the reference target pattern continued from the estimation trajectory Qd set in step S14, on the basis of the target data representing the reference target pattern in a period up to the exiting of the reference target T from the rear-side interpolation region (Irl, Irr) described with reference to FIG. 10A. Further, the estimation-trajectory setting unit 12c may set an estimation trajectory Qf continued from the estimation trajectory Qn, and the process may be caused to exit the estimation-trajectory setting routine. Note that the estimation-trajectory setting unit 12c may set the estimation trajectory Qf on the basis of the estimation trajectory Qd passing inside the dead zone (Dl, Dr). Further, the set estimation trajectories Qn and Qf may each include the position coordinates (x1, y1) for estimating the movement of the estimation reference target and a vehicle speed (Vx1, Vy1) of the same timing held in synchronization with the sampling interval (t) of the sampling performed by the reference-target extraction unit 12a (see FIG. 12).

Figure 10B:
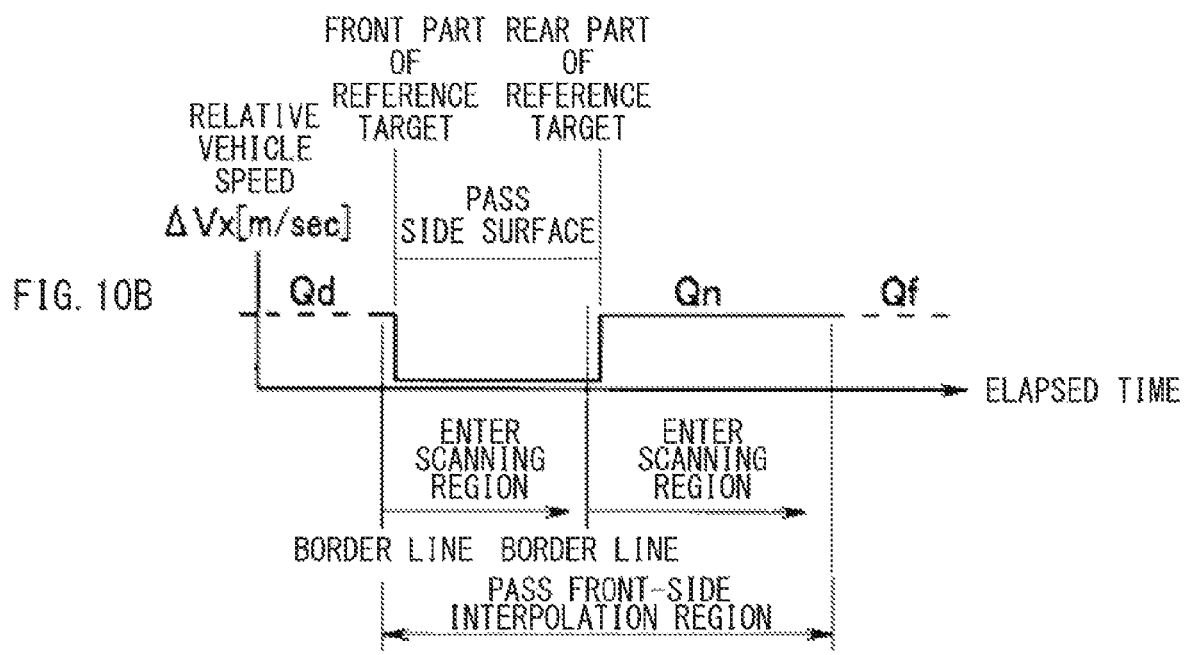
FIG. 10B is a time chart illustrating an example of an estimated reference target pattern set for a front-side interpolation region on the basis of the reference target pattern illustrated in FIG. 10A.

As illustrated in FIG. 10B, in a case where the following vehicle Fa exits the dead zone (Dl, Dr) and enters the front-side interpolation region (Ifl, Ifr), the following vehicle Fa may overtake the own vehicle M and move to the front of the own vehicle M. Therefore, the estimation trajectory Qn may have a pattern opposite to the above-described reference target pattern illustrated in FIG. 10A. Accordingly, the estimation-trajectory setting unit 12c may set the estimation trajectory Qn of the following vehicle Fa that passes the front-side interpolation region (Ifl, Ifr) on the basis of the estimation reference target pattern illustrated as an example in FIG. 10B. Therefore, the term "estimation trajectory Q" described above may collectively refer to the estimation trajectories Qn and Qf.

Note that the moving-object detector 12 may output the estimation reference target based on the estimation trajectories Qd and Q to the drive-assist control processor 11 as reference target data, until the later-described target checking unit 12d determines that the reference target T detected in the front-side interpolation region (Ifl, Ifr) and the reference target T extracted from the rear-side interpolation region (Irl, Irr) are identical to each other.

Figure 5:
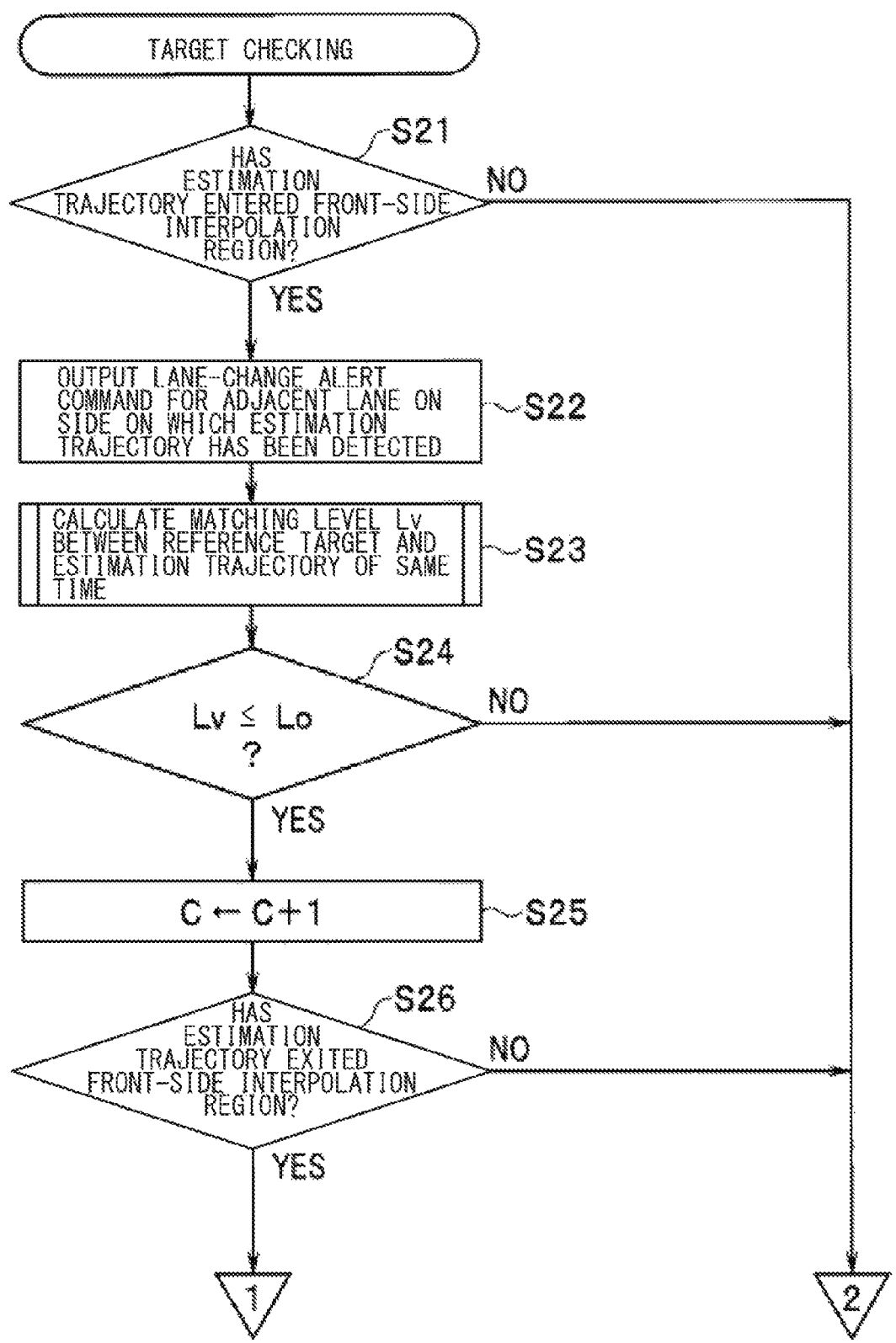
FIG. 5 is a flowchart illustrating an example of a target checking routine (part 1).
Figure 6:
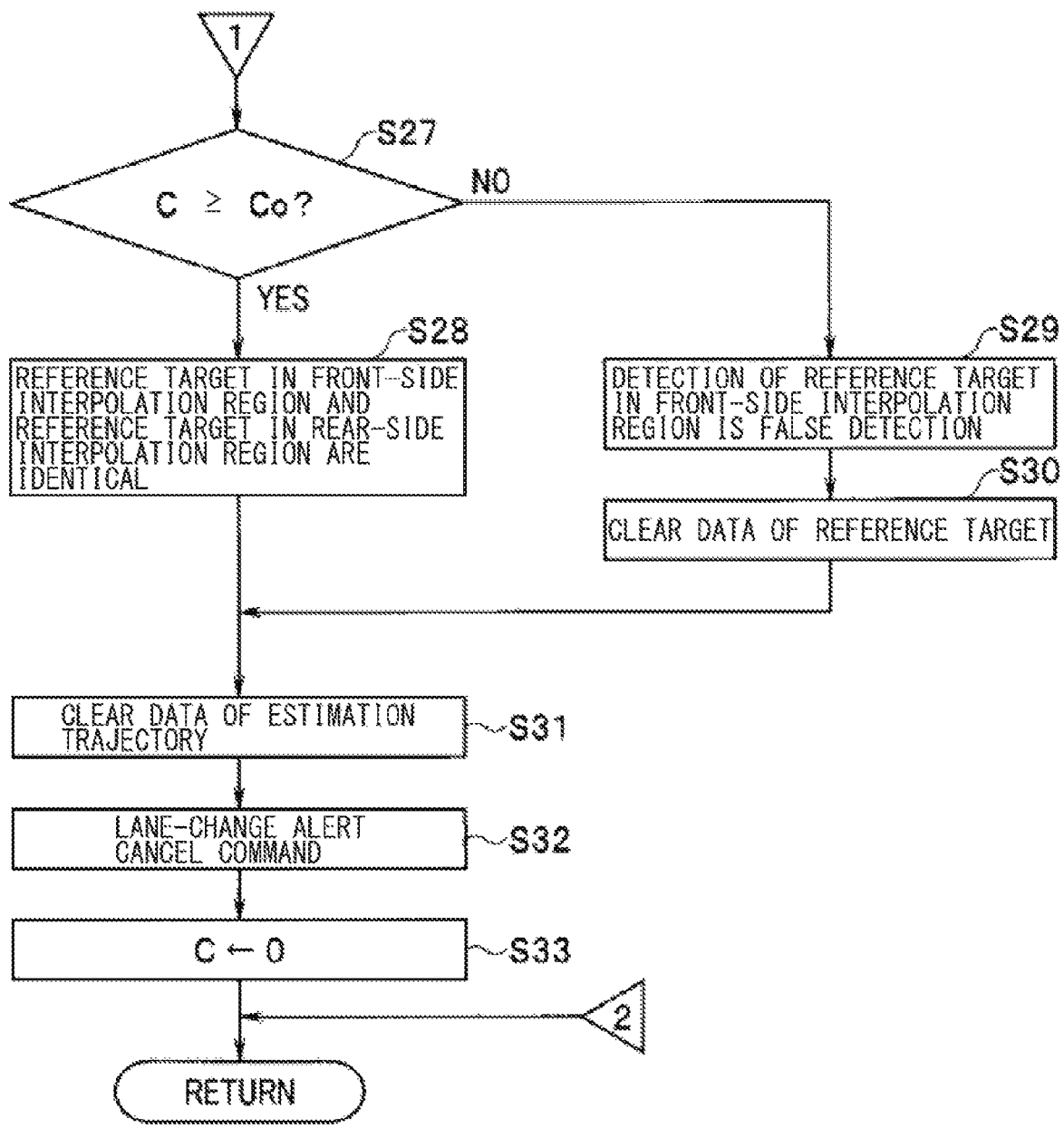
FIG. 6 is a flowchart illustrating an example of the target checking routine (part 2).

The target checking unit 12d may determine whether the reference target T detected in the rear-side interpolation region (Irl, Irr) and the reference target T detected in the front-side interpolation region (Ifl, Ifr) match each other, for example, in accordance with a target checking routine illustrated in FIGS. 5 and 6.

In the target checking routine, first, in step S21, the target checking unit 12d may determine whether the estimation reference target of the estimation trajectory Q has entered the front-side interpolation region (Ifl, Ifr) from the dead zone (Dl, Dr), on the basis of the position coordinates (x1, y1) for estimating the movement of the estimation reference target.

In a case where the entry of the estimation trajectory Q (the estimation reference target) into the front-side interpolation region (Ifl, Ifr) is detected (YES in step S21), the process may be caused to proceed to step S22. In a case where the entry of the estimation trajectory Q (the estimation reference target) into the front-side interpolation region (Ifl, Ifr) is not detected yet (NO in step S21), the process may be caused to exit the target checking routine.

In step S22, the target checking unit 12d may output, to the drive-assist control processor 11, a lane-change alert command for the adjacent lane on the side on which the estimation trajectory Q has been detected. Thereafter, the process may be caused to proceed to step S23.

In a case: where the drive-assist control processor 11 receives, from the moving-object detector 12, the lane-change alert command for the adjacent lane on the side on which the entry of the estimation trajectory Q (estimation reference target) has been detected; and where the drive-assist control processor 11 detects operation, performed by the driver, to make a lane change to the adjacent lane related to the lane-change alert command, the drive-assist control processor 11 may drive the notification device 32 to prompt the driver to pay attention. For example, in a case where the operation to make a lane change corresponds to operation of turning on the signal-light switch 23, and where the driver turns on the switch corresponding to the adjacent lane related to the lane-change alert command, the drive-assist control processor 11 may drive the notification device 32 to thereby notify the driver that the moving object determined by the estimation trajectory Q is traveling on the adjacent lane or that there is a possibility that such a moving object is traveling on the adjacent lane.

Thereafter, in step S23, the target checking unit 12d may check a matching degree between the estimation reference target of the estimation trajectory Q and the reference target T extracted by the reference-target extraction unit 12a on the same time axis.

Figure 11:
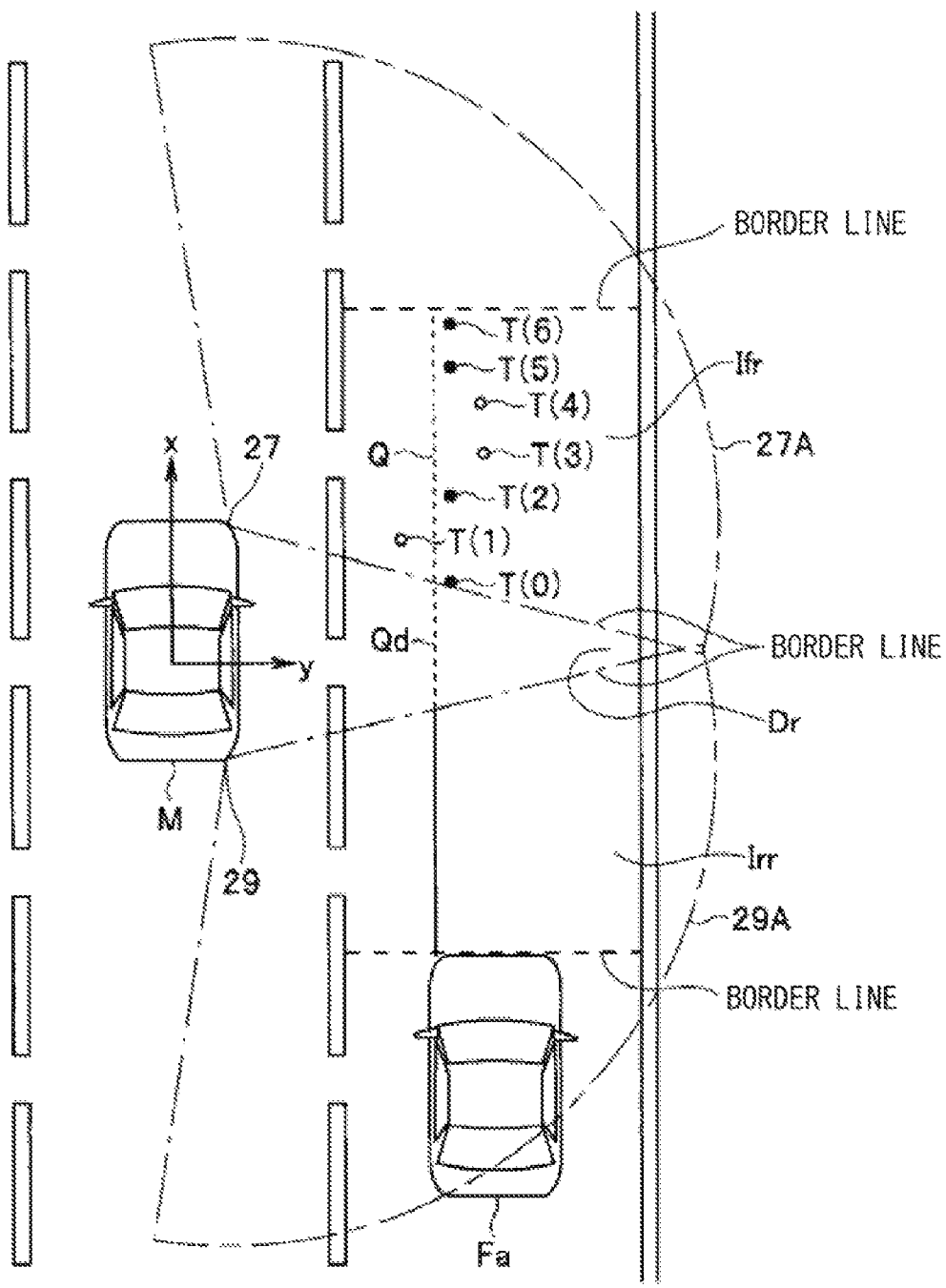
FIG. 11 is a birds-eye view of an example of comparing the reference target detected by the front-side sensor with a movement trajectory based on the reference target detected by the rear-side sensor.

For example, as illustrated in FIG. 11, in a case where the following vehicle Fa is traveling on the adjacent lane on the right, the estimation trajectory Q in the right-front-side interpolation region Ifr may be set on the basis of a traveling trajectory detected in the right-rear-side interpolation region Irr. Further, a movement of the following vehicle Fa in the right-front-side interpolation region Ifr may be estimated with use of the estimation trajectory Q. Here, assume that the reference-target extraction unit 12a has extracted reference targets T(0) to T(6) in the right-front-side interpolation region Ifr in time series at the respective sampling intervals on the basis of the target detected by the right-front-side sensor 27. The target checking unit 12d may compare the estimation reference target of the estimation trajectory Q with one of the reference targets T(0) to T(6) of the same or substantially the same time one by one, to thereby check the matching degree therebetween.

Figure 12:
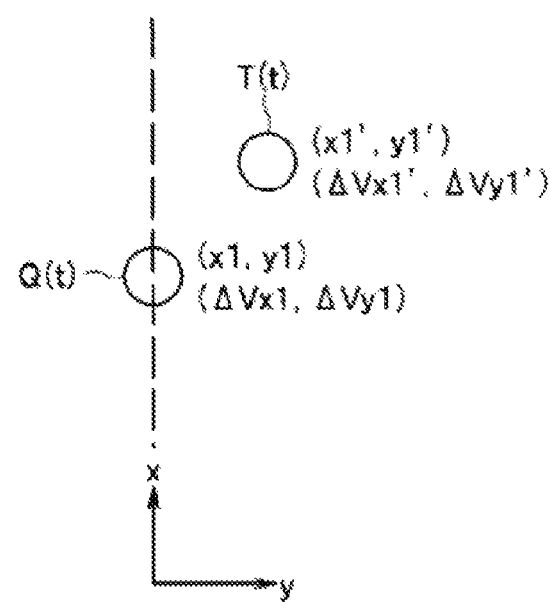
FIG. 12 is an explanatory diagram illustrating an example of a result of comparing the movement trajectory and the reference target detected by the front-side sensor.

A non-limiting example of a method of calculating the matching degree is described below. As illustrated in FIG. 12, the estimation reference target and the reference target of the same or the substantially the same time may be referred to as an estimation reference target Q(t) and a reference target T(t), respectively. Further, assume that the estimation reference target Q(t) has position coordinates (x1, y1) and a relative vehicle speed (ΔVx1, ΔVy1). Further, assume that the reference target T(t) has position coordinates (x1', y1') and a relative vehicle speed (ΔVx1', ΔVy1').

First, a deviation width ΔL in a linear distance between the position coordinates of the estimation reference target Q(t) and the position coordinates of the reference target T(t) may be calculated from the mean square represented by Expression (1), and a speed vector Pv of the respective relative speeds of the estimation reference target Q(t) and the reference target T(t) may be calculated from the mean square represented by Expression (2).

$$\Delta L = \alpha \sqrt{(x1-x1')^2 + (y1-y1')^2} \quad (1)$$

$$Pv = \beta \sqrt{(\Delta Vx1 - \Delta Vx1')^2 + (\Delta Vy1 - \Delta Vy1')^2} \quad (2)$$

α and β in Expressions (1) and (2) may be weight coefficients set for ΔL and Pv, respectively. A ratio between α and β may be set appropriately in accordance with a situation (α=1−β).

Further, the deviation width ΔL of the position coordinates and the speed vector Pv of the relative speed may be added up to calculate a matching level Lv (Lv=ΔL+Pv). The smaller the matching level Lv is, i.e., the smaller the sum total of ΔL and Pv is, the higher the matching degree may be.

For example, in a case where the position coordinates of the estimation reference target Q(t) and the position coordinates of the reference target T(t) are away from each other by (x=2 (m), y=2 (m)), and where the weight coefficient α is 0.5, ΔL is about 1.4 (m).

Further, for example, in a case where the relative vehicle speed of the estimation reference target Q(t) is (ΔVx1=10 (m/sec), ΔVy1=0) and the relative vehicle speed of the reference target T(t) is (ΔVx1'=12 (m/sec), ΔVy1'=0), and where the weight coefficient β is 0.5, the speed vector Pv is 1 (m/sec) in the x-axis direction. Accordingly, Lv is about 2.4.

The value of the matching level Lv may vary depending on the ratio between the weight coefficients α and β. Therefore, it is possible to give a certain degree of freedom to the matching degree with use of the weight coefficients α and β.

Thereafter, the process may be caused to proceed to step S24. In step S24, the target checking unit 12d may compare the matching level Lv and a matching-degree determination threshold Lo. The matching-degree determination threshold Lo may be used to determine whether the estimation reference target Q(t) and the reference target T(t) match each other. The matching-degree determination threshold Lo may be calculated on the basis of an experiment or the like and set in advance, but may be varied and set as desired.

In a case where the matching level Lv is smaller than or equal to the matching-degree determination threshold Lo (Lv≤Lo) (YES in step S24), the target checking unit 12d may determine that the estimation reference target Q(t) and the reference target T(t) of the same or substantially the same time match each other, and the process may be caused to proceed to step S25. In step S25, the target checking unit 12d may increment a count value C of a matching counter (C←C+1), and the process may be caused to proceed to step S26. In a case where the matching level Lv is greater than the matching-degree determination threshold Lo (Lv>Lo) (NO in step S24), the target checking unit 12d may determine that the estimation reference target Q(t) and the reference target T(t) of the same or substantially the same time do not match each other, and the process may be caused to exit the target checking routine.

In step S26, the target checking unit 12d may check whether the estimation trajectory Q has exited the front-side interpolation region (Ifl, Ifr). The target checking unit 12d may compare the position coordinates of the estimation trajectory Q that proceeds in time series and position coordinates of the border line preset on the exiting side of the front-side interpolation region (Ifl, Ifr), to thereby check whether the estimation trajectory Q has exited the front-side interpolation region (Ifl, Ifr). In a case where the estimation trajectory Q is determined as having exited the front-side interpolation region (Ifl, Ifr) (YES in step S26), the process may be caused to proceed to step S27. In a case where the estimation trajectory Q is determined as being present in the front-side interpolation region (Ifl, Ifr) (NO in step S26), the process may be caused to exit the target checking routine.

In step S27, the target checking unit 12d may check whether the count value C of the matching counter is greater than or equal to a reliability determination threshold Co. In a case where the count value C is greater than or equal to the reliability determination threshold Co (C≥Co) (YES in step S27), the target checking unit 12d may determine that the reference target T extracted on the basis of the target detected by the front-side sensor (26, 27) is highly reliable, and the process may be caused to proceed to step S28. In a case where the count value C is smaller than the reliability determination threshold Co (C<Co) (NO in step S27), the target checking unit 12d may determine that it is highly possible that the reference target T has been falsely detected, and the process may be branched to step S29.

In step S28, the target checking unit 12d may hold a result of the determination that the reference target T detected in the front-side interpolation region (Ifl, Ifr) and the reference target T extracted from the rear-side interpolation region (Irl, Irr) are identical to each other. Thereafter, the process may be caused to proceed to step S31. For example, as illustrated in FIG. 11, assume that the estimation reference targets Q(0) to Q(6) (not illustrated) of the estimation trajectory Q and the reference targets T(0) to T(6) of the same or substantially the same times are compared with each other. Further, each of the reference targets T(0), T(2), T(5), and T(6) has the matching level Lv determined to be smaller than or equal to Lo and therefore is determined as matching the estimation reference target Q of the estimation trajectory Q. Each of the reference targets T(1), T(3), and T(4) has the matching level Lv determined to be greater than Lo and is therefore determined as not matching the estimation reference target Q of the estimation trajectory Q. In this case, if Co is set to be 4 (Co=4), the target checking unit 12d may determine that the reference target T detected in the front-side interpolation region (Ifl, Ifr) and the reference target T extracted from the rear-side interpolation region (Irl, Irr) are identical to each other even in a case where an unstable value is detected temporarily due to the noise component superimposed on the reference targets T(1), T(3), and T(4).

Note that, in a case where the reference target T detected in the front-side interpolation region (Ifl, Ifr) and the reference target T extracted from the rear-side interpolation region (Irl, Irr) are determined as being identical to each other in step S28, the moving-object detector 12 may output data, including the position coordinates and the relative speed, of the reference target T detected by the front-side sensor (26, 27) to the drive-assist control processor 11. The drive-assist control processor 11 may execute appropriate drive assist, for example, for a lane change, on the basis of the received data of the reference target T.

In step S29, the target checking unit 12*d* may hold a result of determination that the detection of the reference target T in the front-side interpolation region (Ifl, Ifr) is false detection, and the process may be caused to proceed to step S30. In step S30, the target checking unit 12*d* may clear the data of the reference target T extracted from the front-side interpolation region (Ifl, Ifr), and the process may be caused to proceed to step S31.

Figure 13:
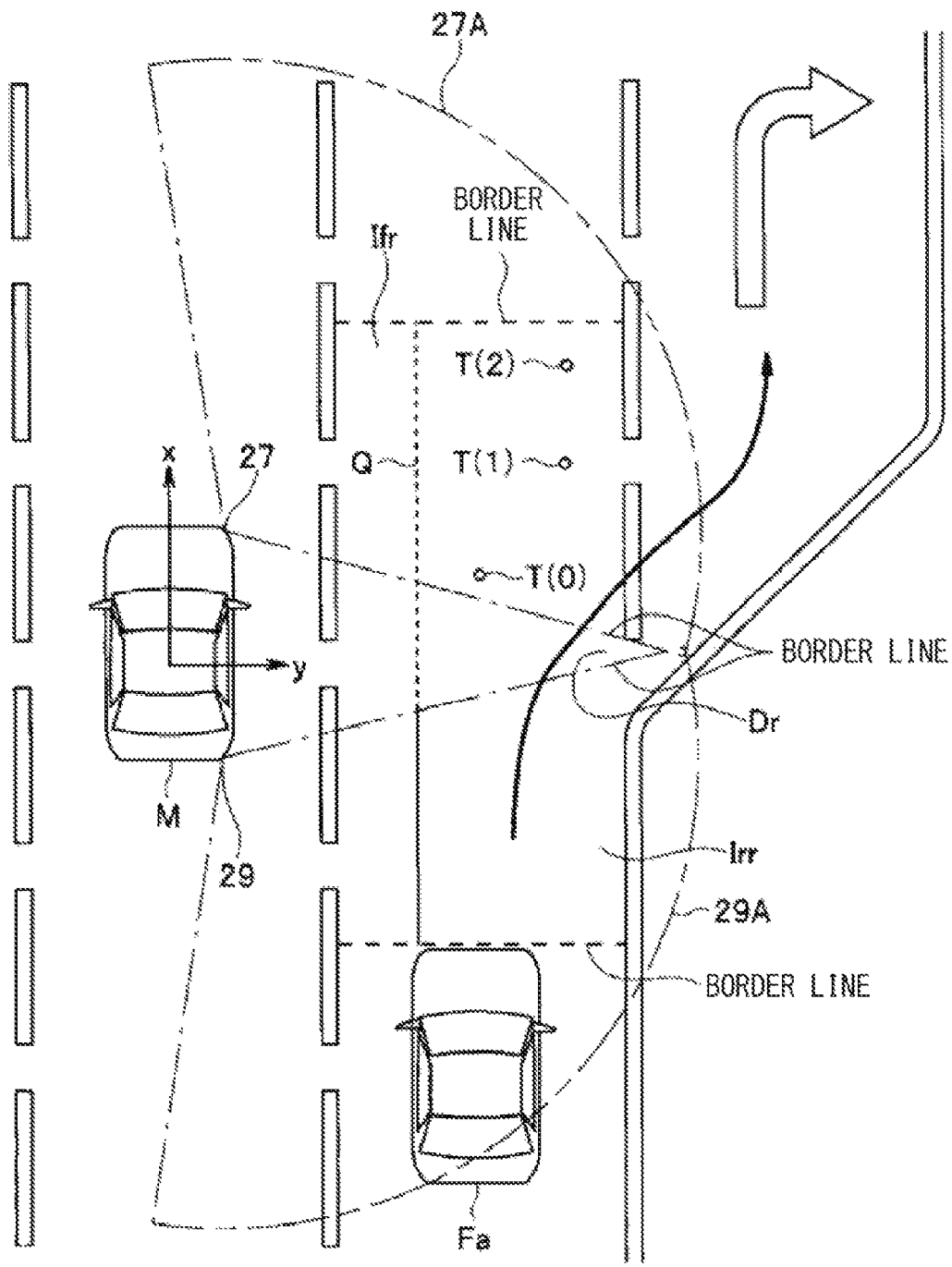
FIG. 13 is a birds-eye view of an example of a case where the reference target derived from the following vehicle detected by the front-side sensor is determined as being a noise component.

For example, as illustrated in FIG. 13, in a case where the following vehicle Fa as the moving object traveling on the adjacent lane makes a lane change from the dead zone Dr to a right-turn lane, it may be clear that the target detected by the front-side sensor 27 is a noise component. Therefore, it may be clear that the reference targets T(0) to T(2) extracted from the noise component has been detected falsely. In this case, if the reference targets T(0) to T(2) are not to be compared with the respective estimation reference targets Q(t) of the estimation trajectory Q of the same or substantially the same corresponding times, it is difficult to clearly determine whether the reference targets T(0) to T(2) are actually present.

In step S30 described above, the falsely detected reference targets T may be found. It is therefore possible to prevent false detection of the following vehicle Fa based on the falsely detected reference target T. In this case, the target detected by the front-side sensors 26 and 27 may be determined as being a noise component, until the estimation-trajectory setting unit 12*c* sets a new estimation trajectory Q.

Thereafter, when the process is caused to proceed from step S28 or step S30 to step S31, the target checking unit 12*d* may clear the data of the estimation trajectory Q. Thereafter, the process may be caused to proceed to step S32. That is, in a case where the reference target T is determined as being the moving object in step S28, the target checking unit 12*d* may hold the data of the estimation trajectory Q until both the estimation trajectory Q and the reference target T exit the front-side interpolation region (Ifl, Ifr). In a case where the detection of the reference target T in the front-side interpolation region (Ifl, Ifr) is determined as being false detection in step S29, the target checking unit 12*d* may hold the data of the estimation trajectory Q only until the estimation trajectory Q exits the front-side interpolation region (Ifl, Ifr). Therefore, the lane-change alert command, for the adjacent lane on the side on which the estimation trajectory Q has been detected, received by the drive-assist control processor 11 may be remain valid until the estimation reference target Q(t) of the estimation trajectory Q exits the front-side interpolation region (Ifl, Ifr) also in the case where the following vehicle Fa makes a lane change to the right-turn lane as illustrated in FIG. 13.

In step S32, the target checking unit 12*d* may output, to the drive-assist control processor 11, a lane-change alert cancel command for the adjacent lane on the side on which the estimation trajectory Q has been detected, because the estimation trajectory Q has exited the front-side interpolation region (Ifl, Ifr). Thereafter, the process may be caused to proceed to step S33. In step S33, the target checking unit 12*d* may clear the count value C of the matching counter (C←0). Thereafter, the process may be caused to exit the target checking routine.

Note that, after the target checking unit 12*d* determines that the reference target T detected in the front-side interpolation region (Ifl, Ifr) derives from the moving object (the following vehicle Fa) and the estimation reference target Q(t) of the estimation trajectory Q exits the front-side interpolation region (Ifl, Ifr), the reference target T may be extracted on the basis of the values detected by the front-side sensor (26, 27).

As described above, according to the example embodiment, the front-side interpolation regions Ifl and Ifr and the rear-side interpolation regions Irl and Irr may be set in the front-rear direction with the dead zones Dl and Dr therebetween. The dead zones Dl and Dr may be present between the scanning regions 26A and 27A of the front-side sensors 26 and 27 and the scanning regions 28A and 29A of the rear-side sensors 28 and 29. The front-side sensors 26 and 27 and the rear-side sensors 28 and 29 may be provided on the own vehicle M. Further, the estimation trajectory Qd passing the dead zones Dl and Dr may be set on the basis of the reference target T detected in the rear-side interpolation regions Irl and Irr. Further, the movement of the moving object Fa or Fb in the dead zones Dl and Dr may be estimated on the basis of the set estimation trajectory Qd. Accordingly, it is possible to appropriately perform drive assist, for example, to prompt the driver to pay attention, also in a case where the moving objects Fa and Fb are passing the dead zones Dl and Dr.

Further, the estimation trajectory Q for estimating the trajectory of the reference target passing the front-side interpolation regions Ifl and Ifr may be set on the basis of the reference target T detected in the rear-side interpolation regions Irl and Irr. The matching degree between the estimation trajectory Q and the reference target T detected by the front-side sensors 26 and 27 of the same or substantially the same time may be checked to determine whether the reference target T detected by the front-side sensors 26 and 27 is identical to the reference target T detected by the rear-side sensors 28 and 29 or is a noise component. Accordingly, it is possible to determine whether the reference target T detected by the rear-side sensors 28 and 29 and the reference target T detected by the front-side sensors 26 and 27 are identical to each other with high accuracy. This helps to prevent false detection.

Note that an embodiment of the technology is not limited to the example embodiment described above. For example, in a case where the own vehicle M is traveling on the basis of automatic driving, when the drive-assist control processor 11 receives the lane-change alert command in step S22, the lane change may be inhibited until the lane-change alert command is canceled.

As described above, according to an embodiment of the technology, a rear-side interpolation region and a front-side interpolation region may be set on an adjacent lane in a scanning region of a rear-side detector. The adjacent lane may be a lane adjacent to a lane on which an own vehicle is traveling. An estimation trajectory may be set on a time axis on the basis of a first target detected in the rear-side interpolation region. The estimation trajectory may be for estimating a movement of the first target into the front-side interpolation region. The estimation trajectory and a second target detected in the front-rear interpolation region may be compared with each other on the same time axis, to thereby check whether the estimation trajectory and the second target match each other. Therefore, it is possible to determine whether a target detected by a rear-side sensor and a target detected by a front-side sensor are identical to each other with high accuracy. Accordingly, it is possible to prevent false detection of the second target.

Each of the drive-assist control processor 11 and the moving-object detector 12 illustrated in FIG. 1 and the reference-target extraction unit 12*a*, the interpolation-region setting unit 12*b*, the estimation-trajectory setting unit 12*c*, and the target checking unit 12d illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the drive-assist control processor 11 and the moving-object detector 12 illustrated in FIG. 1 and the reference-target extraction unit 12a, the interpolation-region setting unit 12b, the estimation-trajectory setting unit 12c, and the target checking unit 12d illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the drive-assist control processor 11 and the moving-object detector 12 illustrated in FIG. 1 and the reference-target extraction unit 12a, the interpolation-region setting unit 12b, the estimation-trajectory setting unit 12c, and the target checking unit 12d illustrated in FIG. 2.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A moving-object detection apparatus for a vehicle, the moving-object detection apparatus comprising:
a first detector configured to scan a rear-side region of the vehicle to detect a first target as a reference target;
a second detector configured to scan a front-side region of the vehicle to detect a second target as the reference target; and
a moving-object detector configured to detect a movement of a moving object on a basis of the first target detected by the first detector and the second target detected by the second detector, the moving object being determined with the first target and the second target,
the moving-object detector including
an interpolation-region setting unit configured to set a first interpolation region on an adjacent lane in a scanning region of the first detector and set a second interpolation region on the adjacent lane in a scanning region of the second detector, the adjacent lane being a lane that is adjacent to a lane on which the vehicle is traveling,
an estimation-trajectory setting unit configured to set an estimation trajectory on a time axis on a basis of a traveling trajectory of the first target detected in the first interpolation region, the estimation trajectory being a trajectory for estimating a movement of the first target into the second interpolation region, and
a target checking unit configured to check a matching degree between the estimation trajectory and the second target.

2. The moving-object detection apparatus for vehicle according to claim 1, wherein
the target checking unit is configured to
compare a position coordinate of the estimation trajectory and a position coordinate of the second target with each other, and compare a relative vehicle speed of the estimation trajectory with respect to the vehicle and a relative vehicle speed of the second target with respect to the vehicle with each other, and
determine the matching degree on a basis of a sum value of a mean square of a difference between the position coordinate of the estimation trajectory and the position coordinate of the second target and a mean square of a difference between the relative vehicle speed of the estimation trajectory with respect to the vehicle and the relative vehicle speed of the second target with respect to the vehicle.

3. The moving-object detection apparatus for vehicle according to claim 1, wherein
the target checking unit is configured to
determine that the estimation trajectory and the second target match each other in a case where the matching degree is lower than a determination threshold,
count number of times of determination that is number of times that the target checking unit has determined that the estimation trajectory and the second target match each other in the second interpolation region, and
determine that the second target and the first target are identical to each other in a case where the number of times of determination is greater than or equal to a predetermined value.

4. The moving-object detection apparatus for vehicle according to claim 2, wherein
the target checking unit is configured to
determine that the estimation trajectory and the second target match each other in a case where the matching degree is lower than a determination threshold,
count number of times of determination that is number of times that the target checking unit has determined that the estimation trajectory and the second target match each other in the second interpolation region, and
determine that the second target and the first target are identical to each other in a case where the number of times of determination is greater than or equal to a predetermined value.

5. The moving-object detection apparatus for vehicle according to claim 3, wherein the target checking unit is configured to hold, in a case where the first target and the second target are determined as being identical to each other, both data of the traveling trajectory and data of the reference target until the traveling trajectory and the reference target exit the second interpolation region.

6. The moving-object detection apparatus for vehicle according to claim 4, wherein the target checking unit is configured to hold, in a case where the first target and the second target are determined as being identical to each other, both data of the traveling trajectory and data of the reference target until the traveling trajectory and the reference target exit the second interpolation region.

7. The moving-object detection apparatus for vehicle according to claim 3, wherein the target checking unit is configured to, in a case where the first target and the second target are determined as being different from each other, hold only data of the traveling trajectory until the traveling trajectory exits the second interpolation region, and output a command to prompt a driver of the vehicle to pay attention upon causing the vehicle to make a lane change to the adjacent lane on a side on which the traveling trajectory is detected.

8. The moving-object detection apparatus for vehicle according to claim 4, wherein the target checking unit is configured to, in a case where the first target and the second target are determined as being different from each other, hold only data of the traveling trajectory until the traveling trajectory exits the second interpolation region, and output a command to prompt a driver of the vehicle to pay attention upon causing the vehicle to make a lane change to the adjacent lane on a side on which the traveling trajectory is detected.

9. The moving-object detection apparatus for vehicle according to claim 5, wherein the target checking unit is configured to, in a case where the first target and the second target are determined as being different from each other, hold only data of the traveling trajectory until the traveling trajectory exits the second interpolation region, and output a command to prompt a driver of the vehicle to pay attention upon causing the vehicle to make a lane change to the adjacent lane on a side on which the traveling trajectory is detected.

10. The moving-object detection apparatus for vehicle according to claim 6, wherein the target checking unit is configured to, in a case where the first target and the second target are determined as being different from each other, hold only data of the traveling trajectory until the traveling trajectory exits the second interpolation region, and output a command to prompt a driver of the vehicle to pay attention upon causing the vehicle to make a lane change to the adjacent lane on a side on which the traveling trajectory is detected.

11. A moving-object detection apparatus for a vehicle, the moving-object detection apparatus comprising:
 a first detector configured to scan a rear-side region of the vehicle to detect a first target as a reference target;
 a second detector configured to scan a front-side region of the vehicle to detect a second target as the reference target; and
 circuitry configured to
  detect a movement of a moving object on a basis of the first target detected by the first detector and the second target detected by the second detector, the moving object being determined with the first target and the second target,
  set a first interpolation region on an adjacent lane in a scanning region of the first detector and set a second interpolation region on the adjacent lane in a scanning region of the second detector, the adjacent lane being a lane that is adjacent to a lane on which the vehicle is traveling,
  set an estimation trajectory on a time axis on a basis of a traveling trajectory of the first target detected in the first interpolation region, the estimation trajectory being a trajectory for estimating a movement of the first target into the second interpolation region, and
  check a matching degree between the estimation trajectory and the second target.

* * * * *